United States Patent
Sachnik

[15] 3,650,199
[45] Mar. 21, 1972

[54] MATERIAL TREATING APPARATUS
[72] Inventor: Norman H. Sachnik, San Angelo, Tex.
[73] Assignee: Range Engineering Development Corp., San Angelo, Tex.
[22] Filed: Jan. 13, 1969
[21] Appl. No.: 790,577

[52] U.S. Cl. ..................................99/235 R, 99/2, 99/81, 99/238.5
[51] Int. Cl. ............................................A23l 1/18
[58] Field of Search ....................99/237, 238, 238.1, 238.2, 99/238.3, 238.5, 238.6, 238.7, 235, 234, 2

[56] References Cited

UNITED STATES PATENTS

| | | |
|---|---|---|
| 1,055,736 | 3/1913 | Gibson....................................99/238.5 |
| 2,458,190 | 1/1949 | Newburger..........................99/238.1 |
| 2,489,135 | 11/1949 | Himmel..................................99/238.5 |
| 3,512,989 | 5/1970 | Smith....................................99/238.6 |

Primary Examiner—Robert W. Jenkins
Attorney—J. Vincent Martin, Joe E. Edwards and M. H. Gay

[57] ABSTRACT

This patent discloses a method and apparatus for treating material such as grain, manure, alfalfa, lightweight aggregate, etc. Hot air circulates throughout the entire system. Heat is first added where desired to the product in a preheater. Additional heat is then added in a heater section where the material is further heated and material such as grain may be popped if desired. The grain may then be passed through conventional rollers.

14 Claims, 8 Drawing Figures

Norman H. Sachnik
INVENTOR
J. Vincent Martin
BY Joe E. Edwards
M. H. Gay
ATTORNEYS Norman H. Sachnik
INVENTOR.
BY J. Vincent Martin
Joe E. Edwards
M.H. Gay
ATTORNEYS Norman H. Sachnik
INVENTOR.
BY
ATTORNEYS

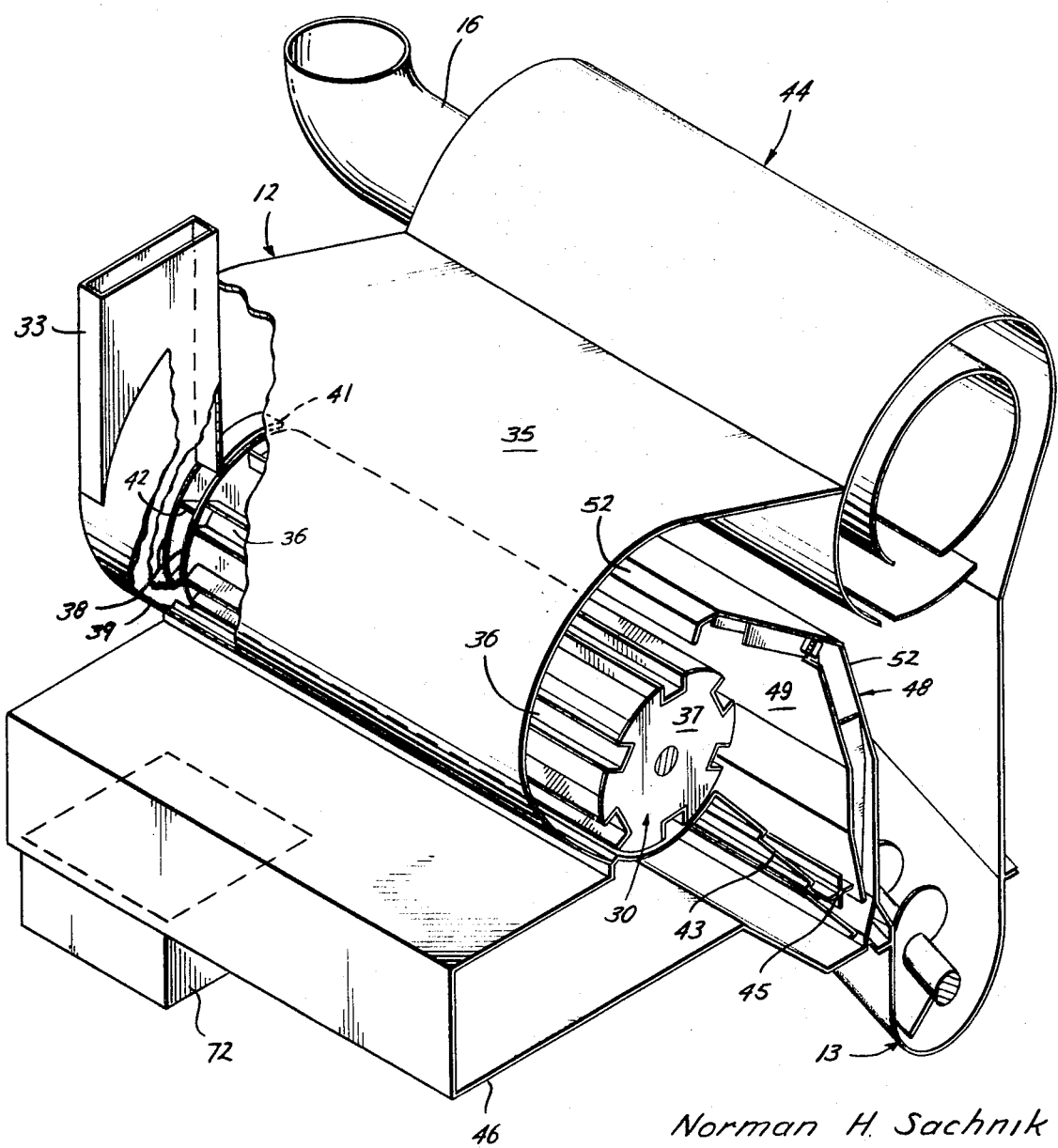

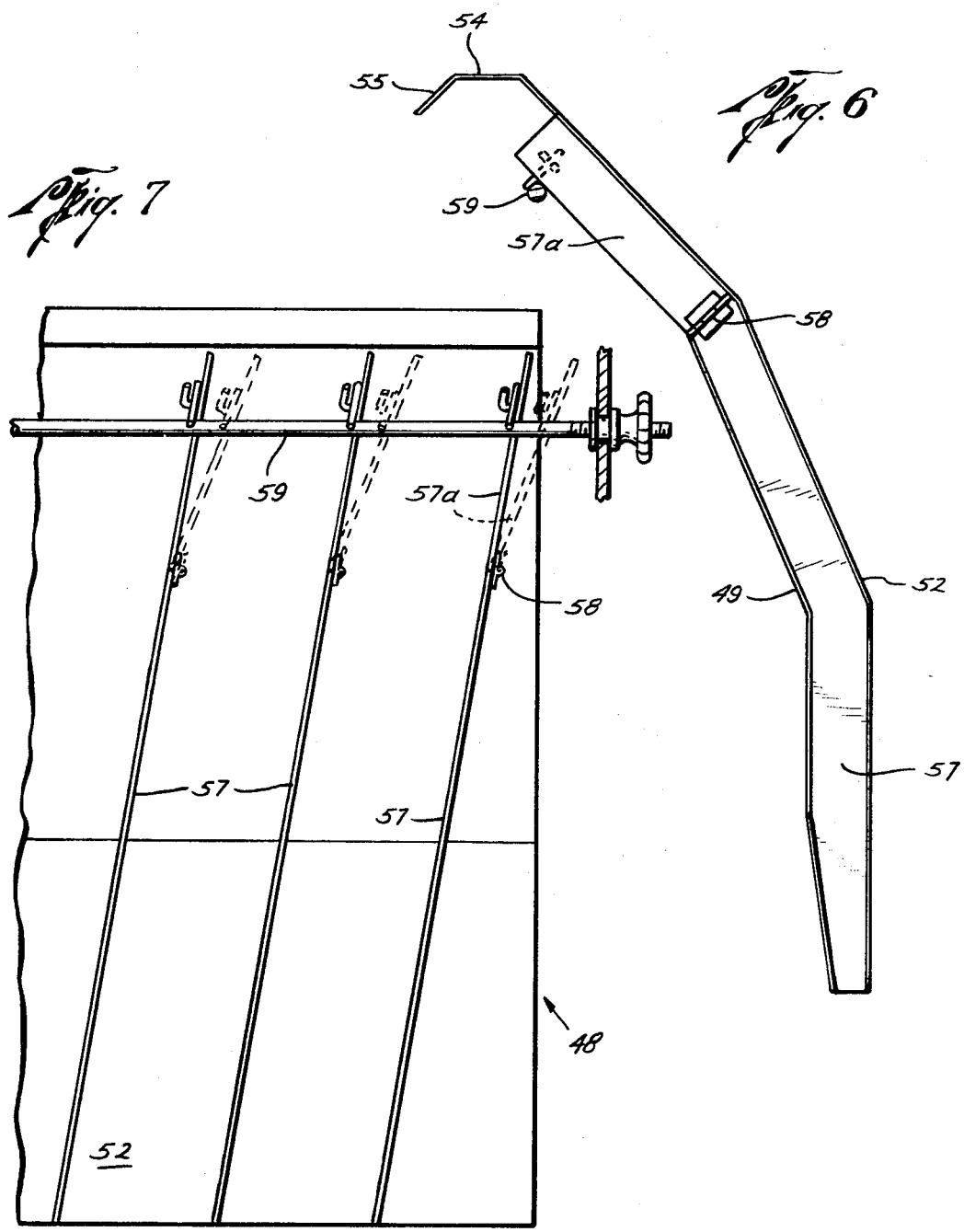

MATERIAL TREATING APPARATUS

This invention relates to an apparatus for treating material. The apparatus may be used to dry any desired product, such as barn manure, alfalfa, lightweight aggregate, etc., or to pop grain.

The invention has been tested as a grain popper and the specification will be directed to the problems of grain popping, but it will be understood that it may be used in any situation where heating of materials is desired.

Cattle are poor chewers. In order to make grain, such as milo, readily available to the digestive system of cattle, it is preferred to treat the grain in some manner which makes it readily digestible.

Grain has been cracked by passing it through heavy rollers to break up the grain and make it more readily available to the digestive system. Grain has also been heated and rolled through heavy rollers to make it more readily digestible. In this process heat is added and the moisture present in the grain tends to soften the grain and permit it to be rolled into flakes. Steam, at atmospheric or elevated pressure, has been the usual source of heat in the flaked grain process. While the flaked grain has been successfully used, it leaves much to be desired. It takes about two weeks for cattle to become accustomed to flaked grain. During this two weeks' period they do not eat as much as they do after they become accustomed to flaked grain. Thus, their weight gain during this two weeks' period is not up to par. Also, the moisture content of the grain varies. Thus, the bulk density of the grain varies and the nutritional value of a given volume of grain will vary. It also might be noted that the grain will be affected by its maturity, moisture content before being treated, etc.

Attempts have been made to pop grain, but insofar as is known these attempts have been unsuccessful. Of course, grain can be popped in a batch process, such as popcorn is popped for human consumption. Such a process, however, is not economically feasible for large scale feeding of cattle.

The principal problem in popping grain is that the temperature utilized to pop is also the temperature at which the grain will char and burn. Charring or burning breaks down the proteins and destroys the food value of the grain. Thus, in the prior art process of flaking, the temperature has been maintained at a maximum of about 200°F. This temperature is not sufficient for popping. Popping occurs when the temperature of moisture within a kernel of grain is raised above the boiling point to vaporize the moisture and build up sufficient pressure to pop the kernel of grain. Preferably the grain is raised to a temperature in excess of the boiling point of moisture to insure popping of a high percentage of the grain passing through a popping system. Obviously this high temperature condition requires very close control of conditions to minimize the problem of charring and burning. By very close control of conditions, the grain may be popped and removed from the popping zone with a substantially constant moisture content, even though the physical properties of the grain entering the system may vary in moisture content, maturity, etc.

While it has been generally thought that the grain could not be successfully popped in a continuous process, the method and system disclosed herein has been used to successfully pop grain on an economical basis. In fact, it has been found that the equipment utilized in popping grain will cost approximately fifty per cent of the equipment utilized in steam flaking of grain. It has also been found that the cost of operating popping equipment in accordance with this invention compares very favorably with steam flaking now used by the industry. The cost will generally run less than fifty per cent and in comparison with high quality steam flaking the cost of obtaining high quality popped grain may be as low as one-fourth of the cost of high quality steam flaked grain.

Preliminary studies indicate a greater weight gain per pound of feed of popped grain versus flaked grain.

In the drying of alfalfa, uneven drying of leaves and stems presents a problem. If leaves are accelerated relative to the heavier stems in passing through a heater, this problem is minimized.

An object of this invention is to provide an apparatus for continuous popping of grain.

Another object is to provide an inexpensive apparatus for the continuous popping of grain.

Another object is to provide an apparatus for continuous popping of grain wherein the moisture content of the resulting product is relatively high and is constant to give a uniform product.

Another object is to provide an apparatus for treating material in which the material is heated and at least a portion of the heated material is separated from the remainder of the material and accelerated to quickly remove it from the heat zone.

Another object is to provide an apparatus which may be used to pop grain, to heat alfalfa, to heat and expand lightweight aggregate such as perlite, to dry manure, etc.

Another object is to provide an inexpensive apparatus for heating material, such as lightweight aggregate, which is much less expensive to manufacture and to operate than the conventional rotary kiln.

Another object is to provide an apparatus for heating material, such as alfalfa, in which leaves are accelerated relative to stems in its movement through the heater, and thus the tendency for uneven drying at the drying temperature is minimized.

Another object is to provide an apparatus for popping grain which also may be utilized at the feed lot for drying manure to provide a saleable product.

Another object is to provide an apparatus for treating material in which the lighter density material which may be involved in the feed material, or which may become lighter during heating, is accelerated relative to the heavier density material to quickly remove it from the heat zone.

Another object is to provide an apparatus for popping grain when the heat for popping the grain is provided by heated air.

Another object is to provide an apparatus for popping grain wherein grain is popped and at least a portion of the popped grain is immediately separated from the unpopped grain and accelerated to quickly remove it from the heat zone.

Another object is to provide an apparatus wherein grain is popped by heat and conventional rollers are used only to pop the small percentage of grain which passes through the grain popper without popping.

Another object is to provide an apparatus to slowly add sensible heat to grain and then rapidly add the latent heat to grain to effect the popping thereof.

Another object is to provide an apparatus as in the preceding object in which the heat is added to the grain in a substantially saturated atmosphere to avoid dehydrating the grain.

Another object is to provide an apparatus in which an air heating system for popping grain is provided and heated substantially saturated air is economically utilized.

Another object is to provide an apparatus for popping grain utilizing a preheater which keeps grainin substantially continuous contact with heated substantially saturated air and slowly adds sensible heat of popping to grain to avoid drying out the grain.

Another object is to provide an apparatus as in the preceding object in combination with a heater for adding any remaining sensible heat and for adding the latent heat of popping rapidly to pop grain before vapor can escape through the shell of the grain.

Another object is to provide an apparatus in which grain is popped by heated air and retention time in the popper can be regulated to accommodate different grains or grains having different physical properties in a single grain popper.

Another object is to provide an apparatus utilizing heated air to pop grain in which the popped grain is removed from the popping zone before it has a chance to char.

Another object is to provide an apparatus as in the preceding objects in which material other than grain is treated by the same method and apparatus, or in which grain is treated by the same method and apparatus but is not popped.

Other objects, features and advantages of the invention will be apparent from the drawings, the specification and the claims.

Referring now to the drawings, wherein an illustrative embodiment of this invention is shown and wherein like numerals indicate like parts:

FIG. 5 is an isometric view of the heater and separator portion of the apparatus with parts broken away to illustrate details;

FIG. 6 is an end view through the duct portion of the apparatus with the inner plate 49 omitted;

FIG. 7 is a side view of a fragment of the duct portion of the apparatus; and

Figure 1:
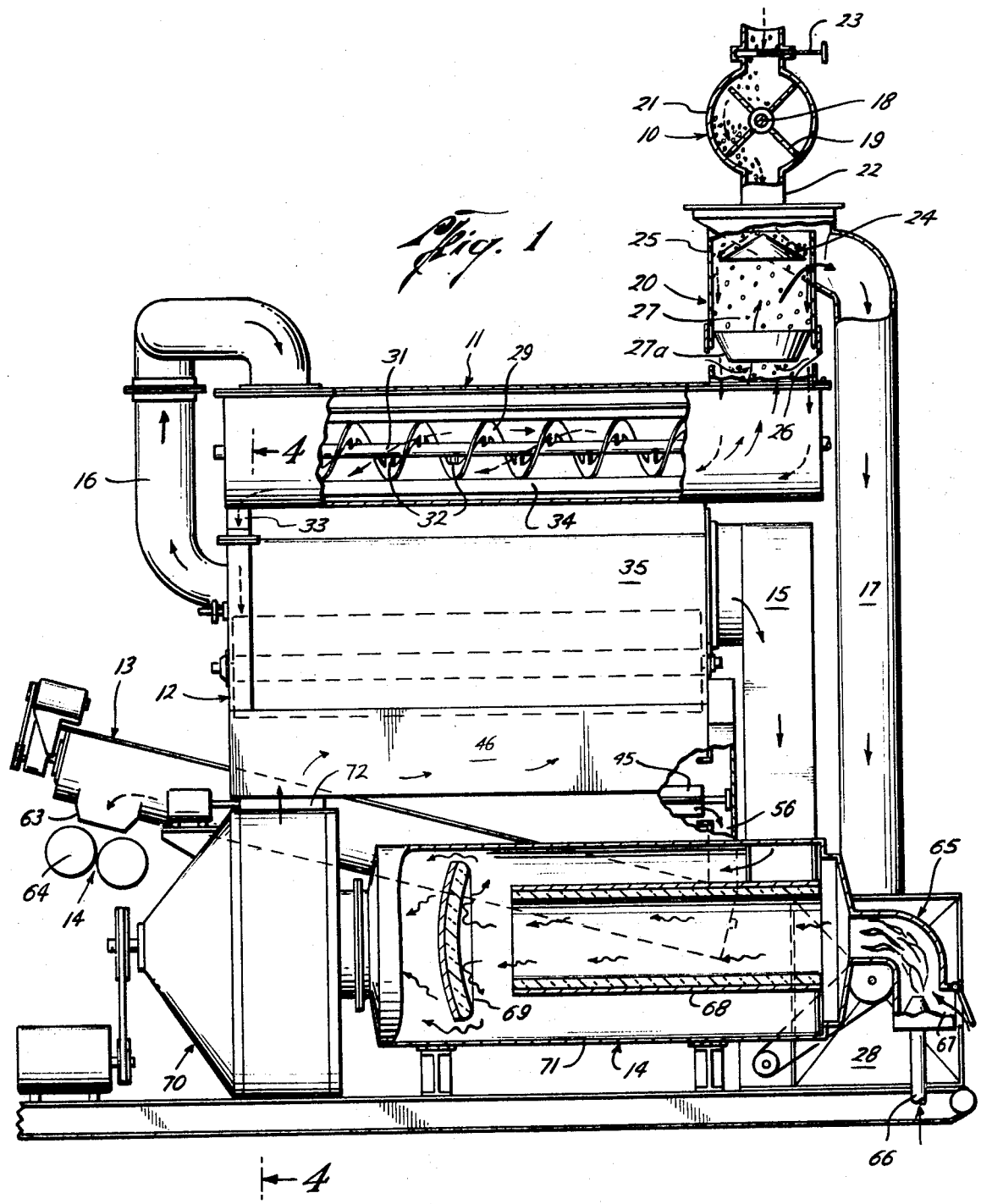
FIG. 1 is a view in side elevation of an apparatus constructed in accordance with this invention with parts broken away to illustrate details of the apparatus.

In practicing the process of this invention, grain is conducted to a first area in which sensible heat is added to the grain. Thus, in the first area the grain and the moisture therein is brought up to a temperature approaching the boiling point of moisture in the grain. Preferably the atmosphere in this area is saturated, or nearly saturated, so that moisture is not removed from the grain in any substantial amount. To give even heating, it is preferred that the grain be constantly agitated in this area so that even heating will occur.

After the grain is preheated it is then moved into a final heating area in which any remaining sensible heat needed is added, and the latent heat needed to vaporize moisture in the grain is added. Here again, it is preferred that the grain be constantly agitated so that there are no stagnant areas. The process is preferably closely controlled so that the popped grain is removed from the heater area before it chars.

In order to quickly remove popped grain from the heater before it chars, it is preferred that there be some separation of the popped grain from unpopped grain and acceleration of flow of the popped grain through the heater area. In accordance with one aspect of this invention, random kernels of grain which have been popped are separated from the remainder of the grain at a plurality of points along the path of travel of the grain through the heater area and accelerated relative to the remainder of the grain to thus accelerate travel of grain after it is popped through the heater area to remove it therefrom before charring.

Preferably, the method of handling the grain in the heater area is one employing upwardly flowing currents of air which serially raise the grain. After the grain is raised, the air and grain are separated and the grain is permitted to fall in the area. The circulation of air is preferably such that some popped grain is immediately returned to the next upwardly flowing current of air, while the remainder of the grain is retained in the area for a longer time. Thus, random kernels of popped grain are accelerated relative to the remainder of the grain to reduce their retention time in the heater area.

It is further preferred that the currents of air flow generally parallel to each other and at slight angles to the vertical so that grain introduced into one end of the heater area will be lifted by the upwardly flowing first current of air and dropped so that it will be picked up by the second current of air. This process is continued until the grain reaches the end of the heater area and is discharged.

To avoid drying out of the grain, it is preferable that the heater area be maintained in a substantially saturated condition. Thus, as the grain passes through the preheater, it is heated without an excessive loss of moisture and, in like manner, the grain passing through the heater is treated without an excessive loss of moisture.

After the grain has been popped, it is preferably rolled between rollers to pop any remaining kernels of grain which have not been popped. The rollers will rupture the shell of the kernel and permit the vapors under pressure therein to pop the kernel.

Referring now to the drawings, flow of grain is indicated by arrows having dashed tails and flow of air is indicated by arrows having solid tails.

Grain such as milo enters the apparatus through the feed hopper indicated generally at 10 and is introduced into the preheater indicated generally at 11, wherein sensible heat is added to the grain to prepare it for popping. The grain passes from the preheater to the heater indicated generally at 12, wherein any remaining sensible heat is added, and the latent heat for vaporization of moisture in the grain is added to pop the grain. Popped grain passes along the conveyor indicated generally at 13 to the rollers indicated generally at 14 wherein the grain is rolled, and any grain which has not popped will pop after passing through the rollers.

Hot air for heating the grain is provided by the air heater indicated generally at 14. Air passes from 14 to the heater 12 and in part returns to the air heater via conduit 15. A portion of the air passes through the conduit 16 to the preheater 11 and thence out of the system through conduit 17.

Considering now in detail the several components of the apparatus, the grain is fed from a suitable hopper not shown through the apparatus 10. This apparatus includes a rotating shaft 18 having a plurality of vanes 19 thereon which cooperate with the shell 21 to substantially prevent upward flow of air while moving the grain to the outlet 22. A control member 23 in the form of a slide or gate valve may be utilized to control flow of grain into the system. This control is normally full open during operation of the system, but will be partially closed during startup to limit flow of grain into the apparatus while it is coming up to normal operating temperature.

The incoming grain first passes through the dust remover indicated generally at 20. The dust remover includes a tubular housing 25 which has therein an upright conical member 24 which forces the grain to drop through a narrow annulus between the housing 25 and the conical member 24. Upwardly flowing air moves countercurrent to the descending grain and removes dust, dirt and like contaminants from the grain.

The air from the preheater is normally completely saturated at this point and there is a tendency for the saturated air to wet the incoming grain and cause sticking problems. To avoid this difficulty, a plurality of holes 26 are provided in the housing 25 to draw fresh air into the system and reduce the dewpoint of air from the preheater. To insure mixing, a sleeve 27 is secured to the housing above the holes 26 and extends downwardly to approximately the lower extremity of the holes. The bottom extremity 27a of the sleeve 27 inclines inwardly and downwardly in frustoconical shape to force incoming fresh air to flow downwardly about the bottom of the frustoconical section 27a of the sleeve and mix with the incoming hot air from the preheater. The mixed air has a dewpoint less than the air temperature so that the tendency of grain to stick is reduced.

The air exhausts through conduit 17 and the blower indicated generally at 28. The blower 28 provides a suction on the system to assist in maintaining air circulation in the desired manner.

Figure 3:
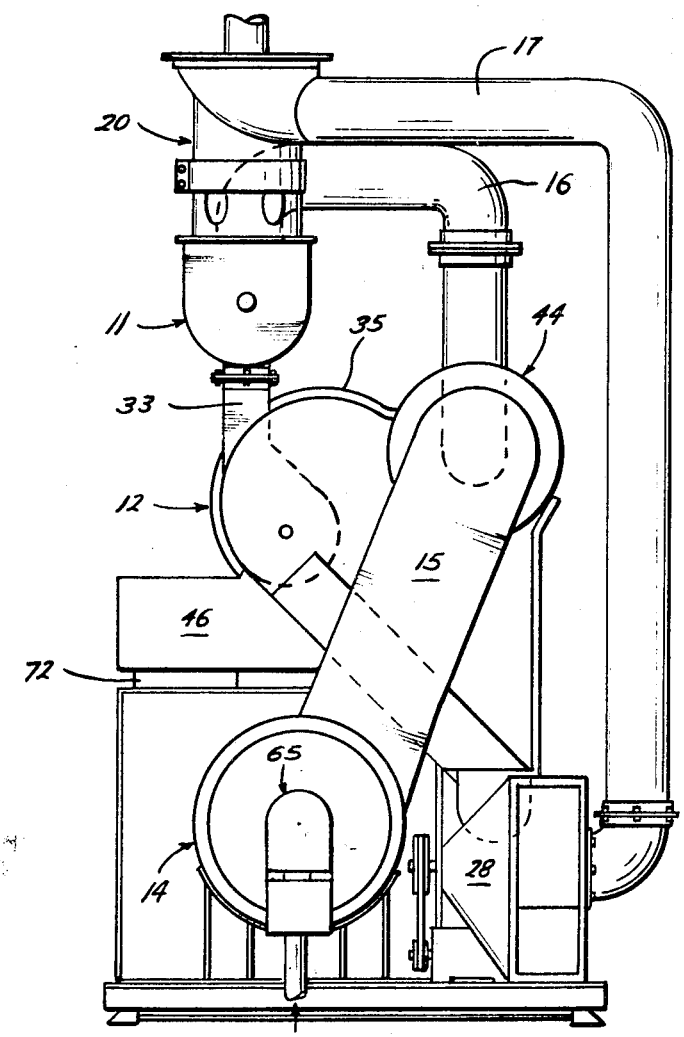
FIG. 3 is an end elevational view of the apparatus.

The cleansed grain drops into the preheater 11. From the end view of FIG. 3 it will be noted that the bottom of the preheater is semicircular. A ribbon auger driven by a motor (not shown) conveys grain through the preheater. The ribbon 29 of the auger is carried on the arbor 31 in spaced relationship thereto by a plurality of support members 32. The level of the grain in the preheater will be high enough to be engaged by the ribbon 29 and moved to the left hand side where it passes through the conduit 33 to the main heater.

Figure 8:
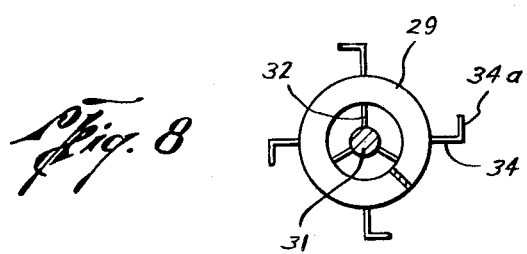
FIG. 8 is an end view of the preheater auger.
Figure 2:
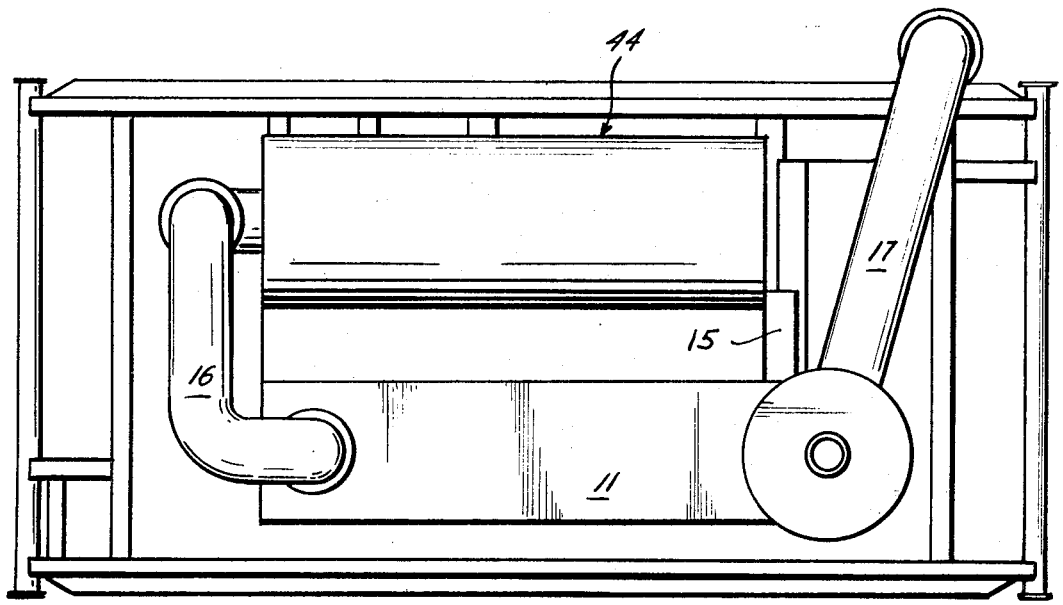
FIG. 2 is a top plan view of the apparatus.

Means are provided on the auger for lifting and dropping grain in the preheater to keep the grain in constant agitation and continuously expose the grain to flow of air through the preheater. In order to accomplish this objective, shovels are provided on the auger which lift the grain and drop it from above the normal grain level. These shovels may be provided by longitudinal angle iron shaped flanges 34 extending radially from the ribbon 29. Note FIG. 8 wherein an end view of the auger is shown. It will be apparent from this figure that as the auger rotates, grain is picked up by the free leg 34a of the flange, lifted and dropped down through the auger where it falls through the air passing through the preheater.

In the preheater heat is slowly added to the grain to provide the sensible heat of vaporization of moisture within the grain. In order to minimize drying of the grain by the hot air, it is preferred that the air passing through the preheater be maintained as close to saturation as possible. As the air flows from the air inlet to the air outlet of the preheater, it will of course be cooled by the relatively cool grain. Thus, to avoid excessive condensation of moisture it will be recognized that air entering the preheater will be slightly under-saturated and, as its temperature is cooled by contact with the grain, it will become substantially saturated by the time it reaches the end of the preheater. If the air entering the preheater is saturated, then as it is cooled by the grain moisture will condense on the grain. So long as this is not excessive and sticking of grain is not a problem, this is not objectionable.

Figure 4:
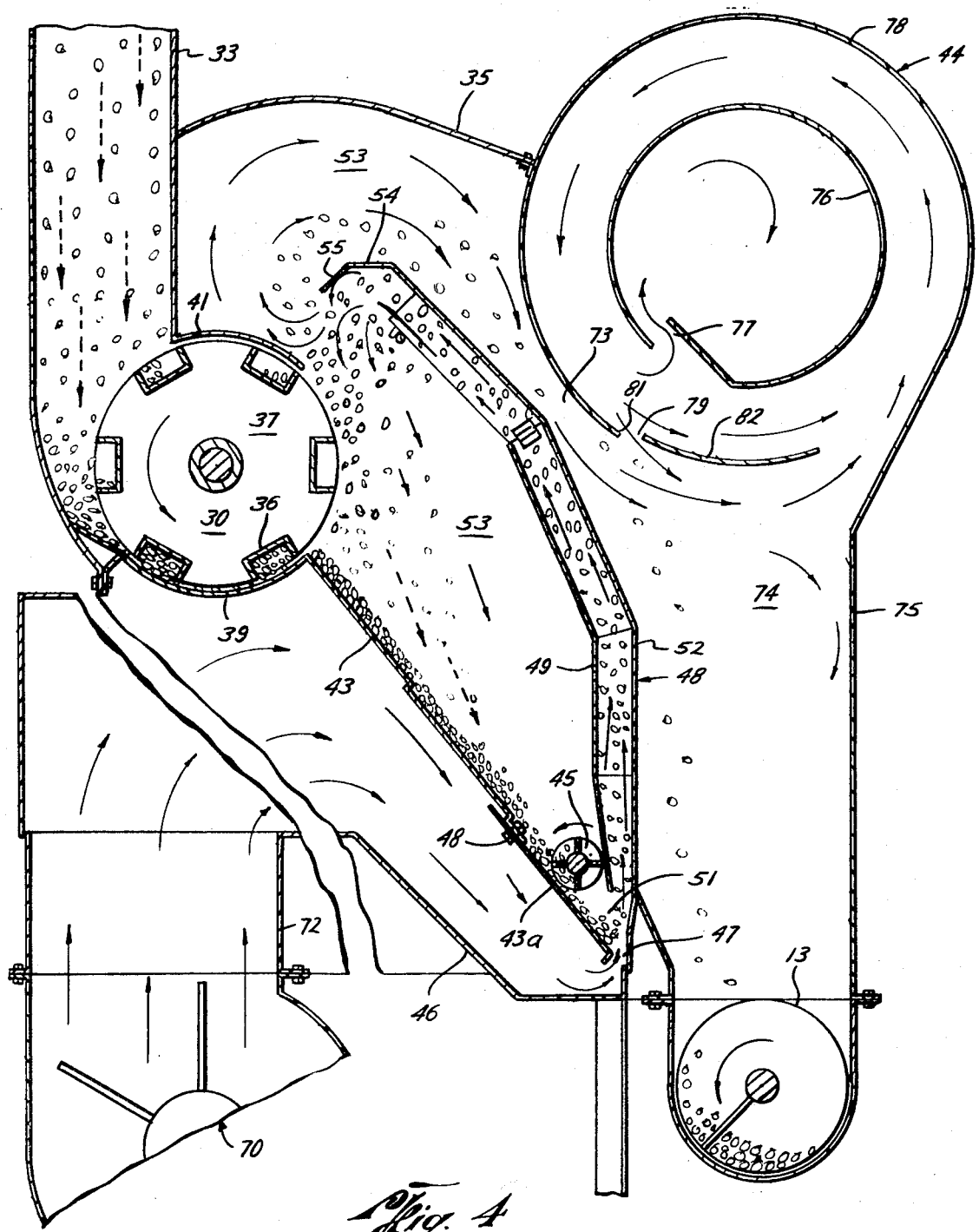
FIG. 4 is a fragmentary view along the line 4—4 of FIG. 1 illustrating flow of grain and air through the heater and separator section of the apparatus.

In the main heater section of the apparatus the grain is further heated to provide any additional sensible heat necessary plus the latent heat necessary to vaporize moisture in the grain to effect popping of the grain. The main heater section includes a body 35 to which the conduit 33 is connected. Reference is particularly made to FIGS. 1, 4 and 5 for an understanding of the operation of this portion of the apparatus.

Within the housing 35 there is provided a bucket wheel indicated generally at 30. This wheel has a number of buckets thereon for catching grain, as will be more fully explained hereinbelow, and providing retention time in the main heater section. These buckets may be provided by longitudinally extending channel iron-shaped members 36 which are supported on the wheel by spaced radially extending plates 37.

In order to prevent flow of air directly from the main heater section to the preheater, an air valve is provided. In FIG. 5, it will be noted that an end plate 37 is spaced from the end 38 of the housing. This plate has a slight clearance with the trough 39 immediately below the wheel 30. The wheel also has a slight clearance with a complementary plate 41 above the wheel. The inlet 33 communicates with the wheel between the trough 39 and plate 41. The bottom end of inlet 33 is complementary to and spaced slightly from the two adjacent plates 37 (FIG. 5). A plurality of veins 42 extend radially from the wheel and have slight clearance with the trough 39 and plate 41. At least one of veins 42 is always in contact with trough 39 and plate 41 to inhibit flow of air. Thus as grain falls down chute 33 it falls into the space between the veins 42 and, as the wheel 30 rotates, the veins sweep the grain out of trough 39 and onto the inclined shelf 43. In this manner grain enters the main heater and air is prevented from leaving the heater without first passing through the separator indicated generally at 44.

The surface 43 is at an angle which is greater than the angle of repose of the grain. This will permit the grain to fall down the surface. However, in order to provide retention time in the chamber, the surface 43 should have a substantial angle with the vertical.

At the bottom of the surface 43 there is provided a breaker wheel 45 which will break up any conglomerates of grain falling down the surface. This wheel 45 extends the full length of the main heater 12.

Means are provided for establishing a path of grain flow from end to end of the heater body 35. Preferably this path has upwardly and downwardly extending sections and at least some popped grain is separated at the upper ends of sections of the path and accelerated to the next upwardly extending section of the path. In the preferred embodiment the wheel 30 and shelf 43 provide the downwardly extending section of the path.

The upwardly extending portions of the path utilize air to lift grain and, before proceeding to the duct system, the source of air for the duct system will be noted.

Hot air under slight pressure is present in the conduit 46. This conduit communicates with an orifice 47 at the extreme lower end of the shelf 43. The lower section 43a of shelf 43 is slidably adjustable to regulate the size of the orifice 47. Bolt 48 is provided for fastening the slidable portion 43a in the desired position. This adjustment is provided to avoid manufacturing tolerance problems.

The small orifice 47 extends the full length of the heater and thus serves as a distributor of the air in conduit 46 and reduces the pressure of air passing therethrough to a slight negative pressure. This results in a substantial increase in the velocity of the air.

Duct means indicated generally at 48 is provided adjacent the orifice 47. One surface 49 of the duct means extends to a point just above the orifice 47 and cooperates with the slidable plate 43a to provide a bottom opening at 51 from the main heater. The other wall 52 of the duct means is spaced from the wall 49 to provide a narrow passage extending upwardly for conducting air to an upper section of the main heater chamber 53. Thus, air passing through the orifice 47 increases in velocity and entrains grain falling down the shelf 43 and carries the entrained grain up through the duct 48 to the upper portion of the chamber. At the upper portion of the chamber, the duct has slowly changed directions from the vertical to the horizontal direction provided by plate 54. Preferably, the duct ends in a plate 55 which extends downwardly so that the air moves up the duct 48 beginning in a vertical movement and then scribes a circle to finally be directed downwardly and to the left as shown in FIG. 4. It will be noted that the terminal portion 50 of the duct is over the bucket wheel 30 and directs grain down toward the wheel. At this point the air flow divides. A small portion of the air flows back down the chamber 53 due to the negative pressure at the orifice 47. This flow of air is important as it will tend to carry with it random kernels of grain which have been popped and are relatively light in bulk density. Thus a portion of the popped grain will be accelerated in its movement through the main heater, as will appear hereinafter.

In FIG. 7 a form of duct is shown in which the plate 49 has been omitted. Due to the velocity of flow in the duct system the plate is not necessary, particularly with light material such as milo. When the plate is omitted the popped grain will tend to fall out along the length of the duct system and reduce retention time of the popped grain.

The principal portion of the air leaving the duct 48 moves upwardly to the upper section of the chamber 53 and passes therefrom to the separator indicated generally at 44. A small amount of popped grain, dust, etc., will normally be entrained in this air stream.

In order to give retention time in the main heater, at least a portion of the grain passing up through the duct 48 is caught in the buckets 36 on the wheel 30. Of course, a portion falls through the space between buckets onto the trough 39 and additional retention time results. Some of the grain will probably fall directly onto the surface 43.

Means are provided for causing the grain as it travels in the circle of bucket wheel to bottom outlet 51, through duct 48 and back to the wheel section to move from the inlet end of the main heater to the opposite end of the main heater where it is discharged through the outlet 56 (FIG. 1). This movement may be provided in any desired manner. In the preferred form of apparatus as shown herein, this movement is provided by the duct means 48. Referring particularly to FIG. 7, it will be noted that duct means 48 includes a plurality of generally vertically extending but slightly inclined dividers 57. It will be seen from FIG. 7 that grain entering at the bottom of the duct means in effect flows through a plurality of ducts which are arranged in a row and the row inclined slightly relative to the vertical so that grain is discharged in a vertical plane which is closer to the outlet 56 than the point at which the grain entered the duct system.

Grains of different physical properties require different lengths of time in the main heater section. Control of this time may be provided by making the upper portion of the veins 57 adjustable. Thus the upper sections 57a are hinged at pivot 58. Each vein is connected to a rod 59 which is reciprocal by rotation of the nut 61 on the threaded end 62 of the rod 59. Also, the speed of rotation of the bucket wheel 30 may be varied if desired to control retention time of grain in the chamber 53.

From the above explanation, it will be apparent that grain enters at one end of the bucket wheel 30 and is swept by the bucket wheel to the inclined surface 43 without any substantial amount of air flowing up the conduit 33. The grain tumbles down the inclined surface 43, is broken up, if necessary, by the breaker wheel 45 and leaves the chamber at the bottom outlet thereof. Air then entrains the grain and passes it up the duct system 48 and drops the grain out at a point above the bucket wheel. In the process of moving up the duct system, the grain is of course heated by the hot air which is in direct heat exchange relationship therewith. The stream is forced to turn and finally exit from the duct system in a slightly downward direction, directing the grain downwardly in the direction of the bucket wheel. Popped grain will have a lighter bulk density, and a small portion of this grain will be carried out with the main air stream. Another portion of this popped grain will be carried back downwardly through the chamber 53 in a portion of the air stream and delivered immediately to the outlet 51. The remaining grain will be deposited on the wheel or dropped through the wheel onto the trough and retention time is provided by the rotation of the trough. While some unpopped kernels of grain may drop directly onto the inclined surface 43, the unpopped grain for the most part will have sufficient velocity to be carried onto the wheel and trough and only popped grain will tend to follow the air stream back down chamber 53. Thus, random particles of popped grain are accelerated through the system. As the grain makes the circuit of the duct system, it is moved each time by the inclined individual ducts from the inlet toward the outlet of the chamber and finally drops into the outlet 56.

It will be noted that the outlet 56 is over one end of the auger 12 which conveys grain to the outlet 63. The grain passes from the outlet 63 to a pair of rollers 64 which are conventional in form but which require substantially less horsepower than rollers heretofore employed in flaking grain. In flaking grain, substantial horsepower is required as the grain has not been popped. In the instant process, substantially all the grain will have been previously popped. A small percentage of grain may, however, pass through the machine without being popped. This grain, however will have been softened by the heat and moisture, and as it passes through the rollers the shell of the grain will be ruptured and the grain will pop as it passes through the rollers. The rollers will also tend to flake the popped grain, but this is not objectionable.

It should be noted that the air stream heats the surface 43 as it passes through the duct 46 and also supplies heat through the duct system 48 and directly by circulating through the chamber 53. As the grain pops, moisture is released to increase the dewpoint of the hot air. By recirculating the air stream, at least in part, the dewpoint of the air may be brought up to a point where it approaches saturation, and thus excessive moisture loss from the grain is avoided. For instance, the chamber 53 may be operated at a temperature of 650° with a dewpoint of about 550°.

With these high temperatures, it will be appreciated that the grain must pass through the system very rapidly. With milo it has been found that the grain should remain in the preheater about one minute and in the main heater section about one-half minute.

Referring now to the air stream, the burner system 14 includes a suitable burner shown generally at 65 fed preferably by natural gas through conduit 66 and air through the inlet 67. Preferably the burner is regulated to be operating in an oxygen-poor atmosphere. The burning gases pass into the refractory-lined tube 68, impinge upon and pass around the refractory-lined shield 69. This shield keeps the blower indicated generally at 70 from seeing any of the hot gases. Recirculated air through the conduit 15 passes into the annulus between the exterior wall 71 of the burner assembly and the refractory-lined tube 68. This incoming air cools the tube 68 and mixes with the newly heated gases as it passes around the shield 69. The gases are further mixed in the blower 70 and are directed upwardly from the blower 70 through the conduit 72 into the conduit 46 as best shown in FIG. 4. The hot, moist gases are at a slight positive pressure in the conduits 72 and 46.

The air, as previously explained, flows up through the duct 48 and circulates through chamber 53 and all of the air ultimately passes through the top of chamber 53 and to the separator 44. As indicated by the arrows, the air passes through a narrow throat 73 and then into a large area 74 and impinges against the wall 75 of the separator section. In the chamber 74 most of the solids which are entrained in the air stream fall out and fall onto the conveyor 13 to join the popped grain falling through the outlet 56. The air then passes into the separator and, due to the internal substantially concentric tube 76 which runs the length of the separator, the air circulates in counterclockwise motion. The outlets from the separator are at the ends of and inside of the inner circular member 76 and thus the air must reverse in direction and pass through the narrow opening 77 to reach the inside of the member 76 and exhaust from the separator. This reversal in direction will assist in knocking out any solids which may be entrained. Also, the centrifugal action of the air stream flowing about the outer shell 78 of the separator 44 will tend to cause solids to fall out, and these solids will fall out through the gap 79 and ultimately find their way into the auger 12. It will be noted that the shell 78 of the separator terminates at point 81 and a partial plate 82 is provided which is closer to the center of the separator than the terminal point 81 of the outer shell, thus any solid particles will fall through the opening 79 rather than be carried up onto the higher shelf provided by the plate 82.

From the right-hand end of the separator as viewed in FIG. 1, the principal portion of the air passing through the separator is carried by the conduit 15 to the burner 14 to recirculate in the system to maintain a high dewpoint, and to maintain a high efficiency in the heating system. A small portion of the air leaves the other end of the separator 44 through the conduit 16 and passes into the preheater 11. This air, as previously explained, preheats the grain and then passes to the outlet conduit 17 from which it is exhausted.

While the above discussion has been directed to the popping of grain, it will be appreciated that the system may be utilized to treat grain other than by popping. For instance, by running the system at a lower temperature, grain could be flaked. However, it is expected that the advantages of popped grain are such that under normal circumstances the grain would be raised to the elevated temperature needed for popping. Of course, the system may be used to dry any desired product.

One of the problems present at a feed lot is disposing of barn manure. This system may be used to dry the manure, sterilize weed and grass seeds to give a saleable dry product. By thus disposing of the manure, the problem of contamination of the water table below the feed lot is materially reduced.

Preferably, temperature sensors are provided throughout the system to assist the operator in controlling the operation. Difference in physical properties of the grain may be compensated for by changes in temperature, speed of rotation of the bucket wheel, or adjustment of the duct system 48.

It will be appreciated that the preheater permits grain to be slowly brought up to a temperature close to that for popping, and then the main heater section can rapidly bring the temperature up to the popping level. This rapid raise in temperature prevents a relatively large pressure drop through the shell to insure a good pop. The unit may be used to provide a grain of uniform physical properties, even though it is not necessary to pop it to make it readily digestible. For instance, corn or oats are readily digestible. They are, however, of nonuniform physical properties due to degree of maturity, moisture content, etc. If desired to obtain a uniform grain, they may be passed through the system and rolled to obtain a substantially uniform product. As very low horsepower is needed to operate the rolls after grain has been treated in the heater, the cost is relatively low.

As noted at the beginning of the specification, the system may be used to dry any desired material. For instance, the method and apparatus may be utilized to expand lightweight aggregate, such as perlite, and thus substitute it for the conventional expensive rotary kiln.

Materials of different densities may be successfully dried with much fewer attendant problems than in presently known drying methods. The method and apparatus is particularly useful in those situations in which the feed material is of different density, or in which the density of materials is changed in heating. The acceleration of the light density material, which will usually tend to burn faster than the heavier density materials, speeds it through the system and thus reduces the tendency to burn.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. Material treating apparatus comprising,
   a chamber,
   a material inlet in the chamber for introducing material to be treated,
   an outlet in the bottom of the chamber,
   a material outlet for material to leave the chamber after it has been treated,
   means for directing material from said material inlet to said material outlet including,
      duct means having its inlet adjacent the bottom outlet of the chamber and its outlet in the upper section of the chamber, and means conveying material from the outlet of the duct means to said bottom outlet,
   means providing air at the inlet of the duct means for entraining and conveying material from said bottom outlet to the duct means outlet,
   means for separating the material from the air stream as it leaves the duct means outlet,
   and a separator receiving said air stream and any entrained material and separating such entrained material from the air stream.

2. The apparatus of claim 1 wherein means are provided for heating and recirculating at least a portion of the air stream passing through the separator.

3. The apparatus of claim 1 wherein means are provided in the chamber for maintaining the material therein in constant agitation and regulating the flow of material to the bottom outlet of the chamber.

4. The apparatus of claim 1 wherein means are provided in the chamber for maintaining material therein in constant agitation and regulating flow of material to the bottom outlet of the chamber including a paddle wheel having buckets thereon in the path of material separated from said air stream.

5. The apparatus of claim 1 wherein the duct means includes a plurality of ducts arranged in a row and inclined in the direction of the row so that as material circulates in the chamber it will pass through successive ducts.

6. The apparatus of claim 1 wherein a preheater is connected to the material inlet of the chamber,
   a conduit conducts air from said separator to the preheater,
   a material inlet is provided in the preheater,
   and a ribbon auger is provided in the bottom of the preheater,
   said auger having a plurality of radially extending legs thereon and angled flanges on said legs to pick up material in the bottom of the preheater and drop it while said auger conveys it toward said chamber material inlet in direct heat exchange relationship with air from said separator.

7. The apparatus of claim 1 wherein means are provided in the chamber for maintaining material in constant agitation and regulating flow of material to the bottom outlet of the chamber including a paddle wheel having buckets thereon in the path of material separated from said air stream, and
   a breaker wheel adjacent the bottom outlet of the chamber for breaking up any agglomerates of material as the material passes to the bottom outlet of the chamber.

8. The apparatus of claim 1 wherein the air is provided at the inlet of the duct means at an elevated pressure and the inlet of the duct means is relatively small in size and provides high velocity air at a negative pressure passing by the bottom outlet from said chamber.

9. The apparatus of claim 1 wherein the duct means includes a plurality of ducts arranged in a row and inclined in the direction of the row so that as material circulates in the chamber it will pass through successive ducts, and
   wherein at least a portion of each of said ducts is adjustably inclined providing for adjustment of the retention time of material in said chamber.

10. The apparatus of claim 1 in combination with means for rolling said material after it has been treated.

11. Apparatus for popping grain comprising,
    preheater means for providing at least a portion of the sensible heat for popping grain,
    heater means continuously receiving grain from the preheater and providing any remaining sensible heat and the latent heat for popping grain,
    means in said heater means for constantly agitating the grain,
    and means for supplying heat to said heater means and preheater means and maintaining the atmosphere therein substantially saturated.

12. Apparatus for popping grain comprising,
    preheater means for providing at least a portion of the sensible heat for popping grain,
    heater means continuously receiving grain from the preheater and providing any remaining sensible heat and the latent heat for popping grain,
    means in said heater means for constantly agitating the grain,
    means for supplying heated air to said heater means and means for recirculating at least a portion of said air to maintain a substantially saturated atmosphere in said heater means, and
    means for supplying at least a portion of said substantially saturated recirculated air to said preheater means.

13. Apparatus for popping grain comprising,
    preheater means for providing at least a portion of the sensible heat for popping grain,
    means continuously introducing grain into the preheater at a selected rate,
    means in said preheater for continuously lifting and dropping the grain and moving the grain toward the outlet of the preheater in direct heat exchange relationship with substantially saturated hot air,
    heater means continuously receiving grain from the preheater and providing any remaining sensible heat and latent heat for popping grain,
    means in said heater means for maintaining said grain in continuous agitation and moving it toward a grain outlet in said heater,
    means for supplying heated air to said heater means and means for recirculating at least a portion of said air to maintain a substantially saturated atmosphere in said heater means, and
    means for supplying at least a portion of said substantially saturated recirculated air to said preheater means.

14. The apparatus of claim 13 in combination with means for rolling said grain after it is discharged from the heater means.

* * * * *